United States Patent
Zhang

(10) Patent No.: US 10,404,584 B2
(45) Date of Patent: Sep. 3, 2019

(54) LOAD SHARING METHOD AND ROUTER DEVICE

(71) Applicant: Huawei Technologies Co., Ltd., Shenzhen (CN)

(72) Inventor: Yabo Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 15/607,104

(22) Filed: May 26, 2017

(65) Prior Publication Data

US 2017/0264538 A1 Sep. 14, 2017

Related U.S. Application Data

(63) Continuation of application No. PCT/CN2015/086261, filed on Aug. 6, 2015.

(30) Foreign Application Priority Data

Nov. 28, 2014 (CN) .................. 2014 1 0709183.4

(51) Int. Cl.
*H04L 29/08* (2006.01)
*H04L 29/12* (2006.01)
(Continued)

(52) U.S. Cl.
CPC .............. *H04L 45/58* (2013.01); *H04L 49/50* (2013.01); *H04L 45/121* (2013.01); *H04L 45/24* (2013.01);
(Continued)

(58) Field of Classification Search
CPC ..... H04L 12/775; H04L 12/931; H04L 45/58; H04L 49/50; H04L 45/121; H04L 45/24;
(Continued)

(56) References Cited

U.S. PATENT DOCUMENTS

2008/0049742 A1 2/2008 Bansal et al.
2009/0010167 A1 1/2009 Ma
(Continued)

FOREIGN PATENT DOCUMENTS

CN 1921415 A 2/2007
CN 1984071 A 6/2007
(Continued)

OTHER PUBLICATIONS

Godfrey et al., "Load Balancing in Dynamic Structured P2P Systems," INFOCOM Twenty-third AnnualJoint Conference of the IEEE Computer and Communications Societies, XP010740594, pp. 2253-2262, Institute of Electrical and Electronics Engineers, New York, New York (Mar. 7, 2004). (Year: 2004).*
(Continued)

*Primary Examiner* — Charles C Jiang
*Assistant Examiner* — Kyaw Z Soe
(74) *Attorney, Agent, or Firm* — Leydig, Voit & Mayer, Ltd.

(57) ABSTRACT

In a load sharing method and a router device, each of the router devices in a load sharing relationship obtains load sharing information of all downstream router devices that are in a load sharing relationship with the router device, and when determining load sharing information of the router device, the router device determines the load sharing information of the router device according to the load sharing information of all the downstream router devices that are in a load sharing relationship with the router device, so that a disturbance factor of the router device is different from disturbance factors of all the downstream router devices that are in a load sharing relationship with the router device. Therefore, a coupling degree of load sharing information of all the router devices in a load sharing relationship in the network is reduced, and load sharing at all levels is even.

10 Claims, 3 Drawing Sheets

(51) Int. Cl.
*H04L 12/707* (2013.01)
*H04L 12/727* (2013.01)
*H04L 12/743* (2013.01)
*H04L 12/753* (2013.01)
*H04L 12/775* (2013.01)
*H04L 12/803* (2013.01)
*H04L 12/931* (2013.01)

(52) U.S. Cl.
CPC .......... *H04L 45/48* (2013.01); *H04L 45/7453* (2013.01); *H04L 47/125* (2013.01); *H04L 61/10* (2013.01); *H04L 67/1002* (2013.01)

(58) Field of Classification Search
CPC ............... H04L 47/125; H04L 67/1002; H04L 45/7453; H04L 45/48; H04L 61/10
See application file for complete search history.

(56) References Cited

U.S. PATENT DOCUMENTS

| | | | |
|---|---|---|---|
| 2009/0279431 A1 | 11/2009 | Baruah et al. | |
| 2010/0064008 A1* | 3/2010 | Yan | H04L 45/64 709/204 |
| 2010/0215042 A1 | 8/2010 | Sato et al. | |
| 2012/0287946 A1 | 11/2012 | Matthews et al. | |
| 2013/0107717 A1 | 5/2013 | Yi et al. | |
| 2013/0223275 A1* | 8/2013 | Vasseur | H04L 45/26 370/254 |
| 2014/0310417 A1* | 10/2014 | Sorenson, III | H04L 67/1002 709/226 |
| 2014/0372567 A1* | 12/2014 | Ganesh | H04L 67/1002 709/219 |

FOREIGN PATENT DOCUMENTS

| | | |
|---|---|---|
| CN | 101527685 A | 9/2009 |
| CN | 102143041 A | 8/2011 |
| CN | 104486236 A | 4/2015 |
| EP | 2276207 B1 | 5/2013 |
| EP | 3166268 A1 | 5/2017 |

OTHER PUBLICATIONS

Godfrey et al., "Load Balancing in Dynamic Structured P2P Systems," INFOCOM Twenty-third AnnualJoint Conference of the IEEE Computer and Communications Societies, XP010740594, pp. 2253-2262, Institute of Electrical and Electronics Engineers, New York, New York (Mar. 7, 2004).

* cited by examiner

LOAD SHARING METHOD AND ROUTER DEVICE

CROSS-REFERENCE TO RELATED APPLICATIONS

This application is a continuation of International Application No. PCT/CN2015/086261, filed on Aug. 6, 2015, which claims priority to Chinese Patent Application No. 201410709183.4, filed on Nov. 28, 2014. The disclosures of the aforementioned applications are hereby incorporated by reference in their entireties.

TECHNICAL FIELD

Embodiments of the present application relate to communications technologies, and in particular, to a load sharing method and a router device.

BACKGROUND

When a router device forwards a packet, if there are multiple equivalent outbound interfaces in a forwarding entry, the router device performs load sharing according to a packet feature, and evenly distributes traffic to all the outbound interfaces, to ensure that bandwidth resources of the router device are fully used. Load sharing is classified into two types: per-packet and per-flow. During per-packet load sharing, packets of a service flow are distributed onto different interfaces. The different interfaces have different physical parameters, which may cause out-of-order of the packets of the service flow, and therefore per-packet load sharing is less used in an existing network. During per-flow load sharing, the router device needs to perform hash (HASH) route selection according to a packet feature, and while load sharing is implemented, it is ensured that traffic with a same packet feature passes through a same outbound interface.

If router devices of multiple levels exist in a network, a router device on each level needs to perform hash route selection on traffic, and hash algorithms used by the router devices on all the levels are the same, a problem of uneven multi-level load sharing may exist, and when multi-level load sharing is uneven, a packet loss may be caused. As shown in FIG. 1, FIG. 1 is a schematic diagram of a network structure. When a device A performs hash route selection on traffic, the device A sends the traffic to a device B; the device B performs hash route selection on the traffic by using a same hash algorithm as that used by the device A, and a route selection result of the device B is the same as a route selection result of the device A, which causes a problem of uneven load sharing on the device B.

For the problem of uneven multi-level load sharing, generally, multiple hash algorithms are introduced, or in a hash route selection process, a disturbance factor is used to interfere with a hash route selection result, to reduce a coupling degree of load sharing results of different router devices. However, because a router device has a limited quantity of ports, even if disturbance factors of physical devices are different, a coupling degree of load sharing results obtained by router devices by performing hash operations according to disturbance factors may be also extremely high. In particular, when a network size is huge enough, there is always a case of uneven multi-level load sharing in router devices, which influences network operating quality.

SUMMARY

Embodiments of the present application provide a load sharing method and a router device, to resolve a problem of uneven multi-level load sharing between router devices, and to make multi-level load sharing even.

A first aspect of the present application provides a load sharing method, including:

obtaining, by a router device, load sharing information of all downstream router devices that are in a load sharing relationship with the router device, where the load sharing information includes load sharing algorithms and disturbance factors of all the downstream router devices that are in a load sharing relationship with the router device;

determining, by the router device, first load sharing information of the router device according to the load sharing information of all the downstream router devices that are in a load sharing relationship with the router device, where the first load sharing information includes a first load sharing algorithm and a first disturbance factor that are of the router device, and the first disturbance factor is different from the disturbance factors of all the downstream router devices that are in a load sharing relationship with the router device;

sending, by the router device, the first load sharing information and the load sharing information of all the downstream router devices that are in a load sharing relationship with the router device to an upstream router device that is in a load sharing relationship with the router device; and when the router device receives a data packet, determining, by the router device, a forwarding path of the data packet by using the first load sharing information.

With reference to the first aspect of the present application, in a first possible implementation manner of the first aspect of the present application, each piece of the load sharing information includes a lock status identifier, and the lock status identifier is used to indicate whether corresponding load sharing information is locked;

the determining, by the router device, first load sharing information of the router device according to the load sharing information of all the downstream router devices that are in a load sharing relationship with the router device includes:

determining, by the router device, whether lock status identifiers of the load sharing information of all the downstream router devices that are in a load sharing relationship with the router device are all a locked state; and if the lock status identifiers of the load sharing information of all the downstream router devices that are in a load sharing relationship with the router device are all the locked state, determining, by the router device, the first load sharing information according to the load sharing information of all the downstream router devices that are in a load sharing relationship with the router device; and the sending, by the router device, the first load sharing information to an upstream router device that is in a load sharing relationship with the router device includes:

setting, by the router device, a lock status identifier of the first load sharing information to locked, and sending the first load sharing information to the upstream router device that is in a load sharing relationship with the router device.

With reference to the first aspect of the present application or the first possible implementation manner of the first aspect of the present application, in a second possible implementation manner of the first aspect of the present application, before the obtaining, by a router device, load sharing information of all downstream router devices that are in a load sharing relationship with the router device, the method further includes:

determining, by the router device, whether the router device is a leaf node; and if the router device is a non-leaf node, obtaining, by the router device, the load sharing information of all the downstream router devices that are in a load sharing relationship with the router device.

With reference to the second possible implementation manner of the first aspect of the present application, in a third possible implementation manner of the first aspect of the present application, if the router device is a leaf node, the router device sends second load sharing information to the upstream router device that is in a load sharing relationship with the router device, where the second load sharing information includes a second load sharing algorithm and a second disturbance factor that are of the router device.

With reference to the first aspect of the present application, in a fourth possible implementation manner of the first aspect of the present application, the obtaining, by a router device, load sharing information of all downstream router devices that are in a load sharing relationship with the router device includes:

sending, by the router device, a load sharing request message to an adjacent downstream router device; and receiving, by the router device, a load sharing response returned by the adjacent downstream router device, where the load sharing response includes the load sharing information of all the downstream router devices that are in a load sharing relationship with the router device.

A second aspect of the present application provides a router device, including:

an obtaining module, configured to obtain load sharing information of all downstream router devices that are in a load sharing relationship with the router device, where the load sharing information includes load sharing algorithms and disturbance factors of all the downstream router devices that are in a load sharing relationship with the router device;

a first determining module, configured to determine first load sharing information of the router device according to the load sharing information of all the downstream router devices that are in a load sharing relationship with the router device, where the first load sharing information includes a first load sharing algorithm and a first disturbance factor that are of the router device, and the first disturbance factor is different from the disturbance factors of all the downstream router devices that are in a load sharing relationship with the router device;

a sending module, configured to send the first load sharing information and the load sharing information of all the downstream router devices that are in a load sharing relationship with the router device to an upstream router device that is in a load sharing relationship with the router device; and a second determining module, configured to: when the router device receives a data packet, determine a forwarding path of the data packet by using the first load sharing information.

With reference to the second aspect of the present application, in a first possible implementation manner of the second aspect of the present application, each piece of the load sharing information includes a lock status identifier, and the lock status identifier is used to indicate whether corresponding load sharing information is locked;

the first determining module is specifically configured to: determine whether lock status identifiers of the load sharing information of all the downstream router devices that are in a load sharing relationship with the router device are all a locked state; and if the lock status identifiers of the load sharing information of all the downstream router devices that are in a load sharing relationship with the router device are all the locked state, determine the first load sharing information according to the load sharing information of all the downstream router devices that are in a load sharing relationship with the router device; and the sending module is specifically configured to: set a lock status identifier of the first load sharing information to locked, and send the first load sharing information to the upstream router device that is in a load sharing relationship with the router device.

With reference to the second aspect of the present application or the first possible implementation manner of the second aspect of the present application, in a second possible implementation manner of the second aspect of the present application, the obtaining module is further configured to:

before obtaining the load sharing information of all the downstream router devices that are in a load sharing relationship with the router device, determine whether the router device is a leaf node; and if the router device is a non-leaf node, obtain the load sharing information of all the downstream router devices that are in a load sharing relationship with the router device.

With reference to the second possible implementation manner of the second aspect of the present application, in a third possible implementation manner of the second aspect of the present application, if the router device is a leaf node, the sending module is further configured to send second load sharing information to the upstream router device that is in a load sharing relationship with the router device, where the second load sharing information includes a second load sharing algorithm and a second disturbance factor that are of the router device.

With reference to the second aspect of the present application, in a fourth possible implementation manner of the second aspect of the present application, the obtaining module is specifically configured to:

send a load sharing request message to an adjacent downstream router device; and receive a load sharing response returned by the adjacent downstream router device, where the load sharing response includes the load sharing information of all the downstream router devices that are in a load sharing relationship with the router device.

In the load sharing method and the router device provided in the embodiments of the present application, each of router devices in a load sharing relationship in a network determines load sharing information of the router device by using a negotiation method, to avoid a case in which a disturbance factor in the load sharing information of the router device is the same as a disturbance factor of another router device. Specifically, each of the router devices in a load sharing relationship obtains load sharing information of all downstream router devices that are in a load sharing relationship with the router device, and when determining load sharing information of the router device, the router device determines the load sharing information of the router device according to the load sharing information of all the downstream router devices that are in a load sharing relationship with the router device, so that a disturbance factor of the router device is different from disturbance factors of all the downstream router devices that are in a load sharing relationship with the router device. Therefore, a coupling degree of load sharing information of all the router devices in a load sharing relationship in the network is reduced, and load sharing at all levels is even.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1:
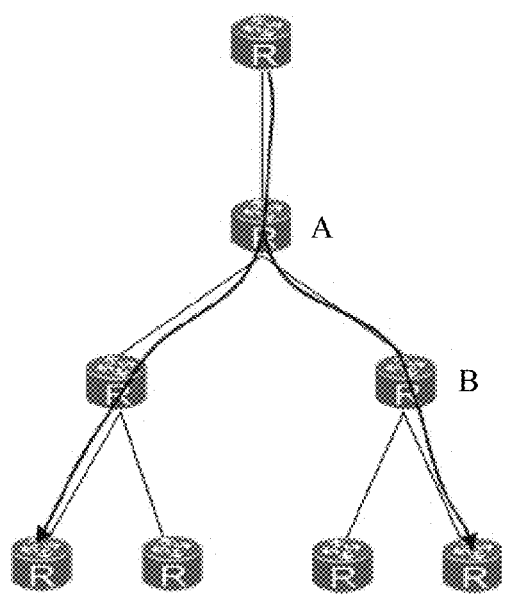
FIG. 1 is a schematic diagram of a network structure.
Figure 2:
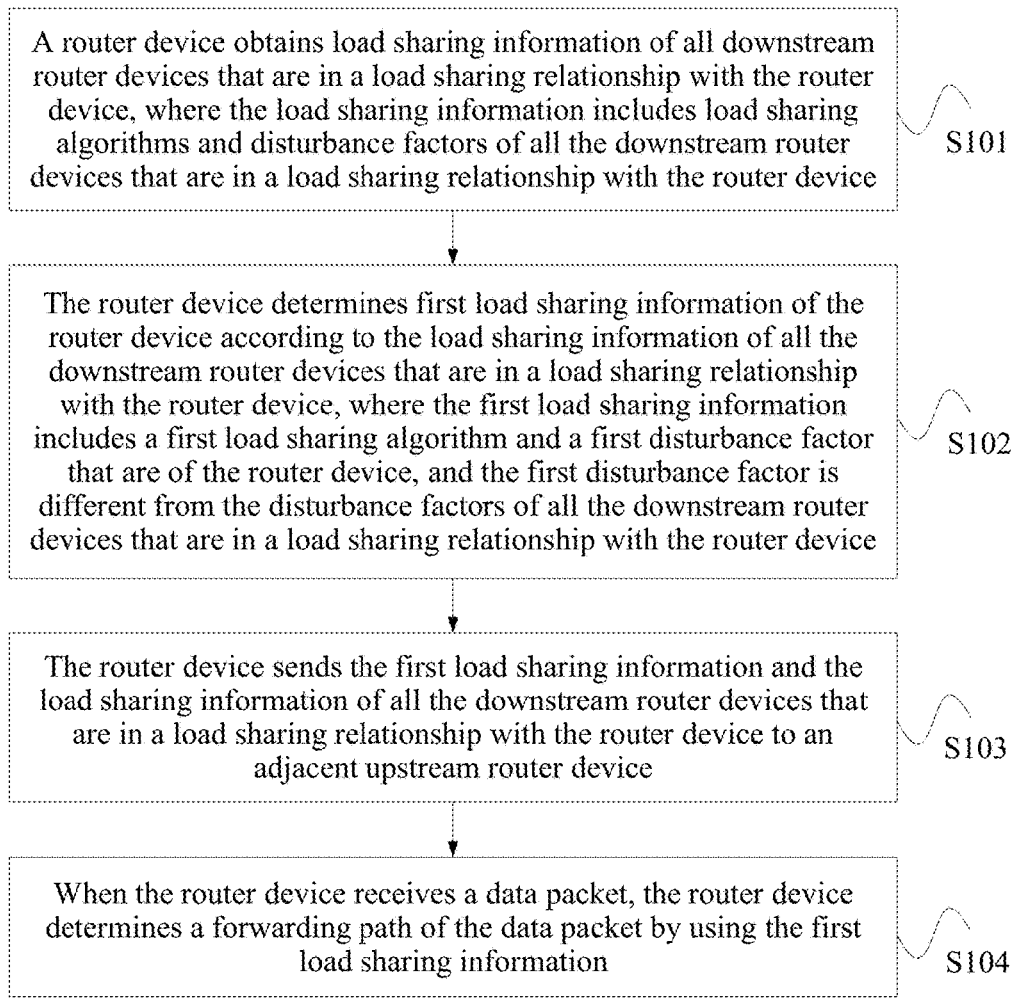
FIG. 2 is a flowchart of a load sharing method according to Embodiment 1 of the present application.
Figure 3:
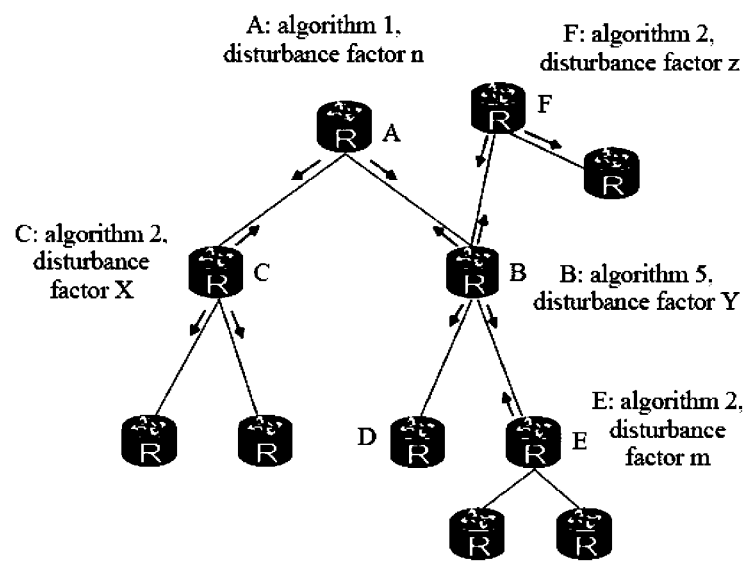
FIG. 3 is a schematic diagram of another network structure.

FIG. 2 is a flowchart of a load sharing method according to Embodiment 1 of the present application. As shown in FIG. 3, the method in this embodiment may include:

S101: A router device obtains load sharing information of all downstream router devices that are in a load sharing relationship with the router device, where the load sharing information includes load sharing algorithms and disturbance factors of all the downstream router devices that are in a load sharing relationship with the router device.

FIG. 3 is used as an example. FIG. 3 is a schematic diagram of another network structure. There are 11 router devices in a network, and the router devices are divided into multiple levels. Router devices A, B, C, D, E, and F are in a load sharing relationship. That the router devices are in a load sharing relationship herein means that the router devices have interfaces in a load sharing relationship, and the interfaces in a load sharing relationship may be outbound interfaces of equal-cost routes, interfaces bundled into a trunk, or the like. For the router devices A and F, load sharing information of the router devices B, C, and E needs to be obtained; for the router device B, load sharing information of the router device E needs to be obtained; for the router devices C and E, there is no load sharing information of downstream router devices that are in a load sharing relationship with the router devices C and E.

In this embodiment, that a router device obtains load sharing information of all downstream router devices that are in a load sharing relationship with the router device may be specifically: the router device sends a load sharing request message to an adjacent downstream router device, and the adjacent downstream router device returns a load sharing response to the router device according to the load sharing request message. The router device receives the load sharing response returned by the adjacent downstream router device, and the load sharing response includes the load sharing information of all the downstream router devices that are in a load sharing relationship with the router device. The load sharing information includes a load sharing algorithm and a disturbance factor that are used by the router device.

Each router device in the network sends a load sharing request message to an adjacent downstream router device of the router device once in each detection period, and the load sharing request message is used to obtain load sharing information of a downstream router device that is in a load sharing relationship with the router device. A time-to-live (Time-To-Live, TTL for short) value of the load sharing request message is 1. Therefore, after receiving a load sharing request message sent by an upstream router device, the adjacent downstream router device does not forward the load sharing request message. After receiving the load sharing request message, the adjacent downstream router device determines whether there is a load sharing interface in the adjacent downstream router device. If there is a load sharing interface in the adjacent downstream router device, the adjacent downstream router device adds, to a load sharing response, load sharing information of the adjacent downstream router device and obtained load sharing information of a downstream router device that is in a load sharing relationship with the adjacent downstream router device, and returns the load sharing response to the upstream router device. If there is no load sharing interface in the adjacent downstream router device, the adjacent downstream router device does not return a load sharing response to the upstream router device. For example, in FIG. 3, after the router device B sends load sharing request messages to the router device D and the router device E, the router device E has a load sharing interface, and therefore the router device E returns a load sharing response to the router device B. The router device D has no load sharing interface, and therefore the router device D does not reply a load sharing response. Finally, each of router devices in a load sharing relationship involved in a multi-level load sharing path may generate a tree table, and the tree table stores load sharing information of all downstream router devices that are in a load sharing relationship with the router device.

Optionally, the load sharing request message further carries load sharing information of the router device, and the carried load sharing information herein is load sharing information currently used by the router device, and is not load sharing information finally determined according to the method in this embodiment of the present application. Specifically, the load sharing information of the router device in an OPTION field may be carried in an Internet Protocol (Internet Protocol, IP for short) header, and a load sharing type, a load sharing algorithm, and a disturbance factor that are of the router device may be carried in an IP option in a type-length-value (Type-Length-value, TLV for short) manner. The load sharing information may use a special Internet Control Message Protocol (Internet Control Message Protocol, ICMP for short) packet, reuse a special field of Interior Gateway Protocol (Interior Gateway Protocol, IGP for short), reuse a special field of Border Gateway Protocol (Border Gateway Protocol, BGP for short), use a special bridge protocol data unit (Bridge Protocol Data Unit, BPDU for short) packet, or the like, which is not limited in the present application.

In specific implementation of the method in this embodiment, a lock principle is introduced to avoid frequent change of load sharing information of a router device. An objective of the lock principle is to ensure that determining of the load sharing information starts from a leaf node, and gradually extends to a root node, to avoid frequent change of load sharing information of a non-leaf node. In addition, the lock principle can ensure that restarting a router device or adding a router device does not cause change of a large amount of load sharing information in a network. The leaf node herein is a router device with no downstream router device, and the non-leaf node is a router device with a downstream router device. In this embodiment, a lock status identifier is set for load sharing information of each router device, where the lock status identifier is used to indicate whether corresponding load sharing information is locked, and that load sharing information is locked means that the load sharing information is in a stable state. When each router device sends load sharing information of the router device to an upstream router device, a lock status identifier value is set according to an actual situation.

S102: The router device determines first load sharing information of the router device according to the load sharing information of all the downstream router devices that are in a load sharing relationship with the router device, where the first load sharing information includes a first load sharing algorithm and a first disturbance factor that are of the router device, and the first disturbance factor is different from the disturbance factors of all the downstream router devices that are in a load sharing relationship with the router device.

Specifically, the router device determines whether lock status identifiers of the load sharing information of all the downstream router devices that are in a load sharing relationship with the router device are all a locked state, and if yes, the router device determines the first load sharing information according to the load sharing information of all the downstream router devices. When determining the first load sharing information, the router device selects a load sharing algorithm with best hash and/or selects a disturbance factor with best hash, to ensure that load sharing at all levels in the network is even. Therefore, the determined first disturbance factor is different from the disturbance factors of all the downstream router devices that are in a load sharing relationship with the router device. However, the first load sharing algorithm may be the same as the load sharing algorithms of all the downstream router devices that are in a load sharing relationship with the router device. In this embodiment, a disturbance factor determined by each router device is different from a disturbance factor of a downstream router device that is in a load sharing relationship with the router device. Therefore, a coupling degree of disturbance factors of router devices at all levels is reduced.

When each router device sends load sharing information of the router device to an upstream router device of the router device, the router device sets a lock status identifier value of the load sharing information. Only when the upstream router device determines lock status identifiers of load sharing information of all downstream router devices that are in a load sharing relationship with the upstream router device are all a locked state, the upstream router device determines the first load sharing information according to the load sharing information of all the downstream router devices that are in a load sharing relationship with the router device. If lock status identifiers of a part or all of the load sharing information of all the downstream router devices that are in a load sharing relationship with the router device are an unlocked state, the router device does not determine the first load sharing information, but sends second load sharing information and the load sharing information of all the downstream router devices that are in a load sharing relationship with the router device to the upstream router device. The second load sharing information herein is load sharing information currently used by the router device, and may be specifically load sharing information determined after previous load sharing information adjustment, or may be default load sharing information. When sending the first load sharing information to the upstream router device, the router device sets a lock status identifier value of the first load sharing information to a locked state. However, when sending the second load sharing information to the upstream router device, the router device sets a lock status identifier value of the second load sharing information to an unlocked state.

S103: The router device sends the first load sharing information and the load sharing information of all the downstream router devices that are in a load sharing relationship with the router device to an adjacent upstream router device.

Specifically, after determining the first load sharing information, the router device sets the lock status identifier of the first load sharing information to a locked state, and then sends the first load sharing information and the load sharing information of all the downstream router devices that are in a load sharing relationship with the router device to the adjacent upstream router device. An objective of sending, by the router device, the first load sharing information and the load sharing information of all the downstream router devices that are in a load sharing relationship with the router device to the adjacent upstream router device is to finally send the first load sharing information and the load sharing information of all the downstream router devices that are in a load sharing relationship with the router device to all upstream router devices that are in a load sharing relationship with the router device, so that the upstream router device that is in a load sharing relationship with the router device determines load sharing information of the upstream router device according to the first load sharing information and the load sharing information of all the downstream router devices that are in a load sharing relationship with the router device.

In the method of this embodiment, each router device in a network determines load sharing information of the router device by using a negotiation method. Determining of the load sharing information starts from a leaf node and extends to a root node. When each of router devices in a load sharing relationship determines load sharing information of the router device, the router device determines the load sharing information of the router device according to load sharing information of all downstream router devices that are in a load sharing relationship with the router device. When specifically determining the load sharing information, each router device considers load sharing information of a downstream router device, and selects a load sharing algorithm with as best hash as possible and a disturbance factor with as best hash as possible. Therefore, a coupling degree of load sharing algorithms of all router devices in a load sharing relationship in the network, and a coupling degree of disturbance factors of all router devices in a load sharing relationship in the network are reduced, and load sharing at all levels is even.

As shown in FIG. 3, final load sharing information of the router devices A, B, C, E, and F that are in a load sharing relationship in FIG. 3 is respectively: a load sharing algorithm of the router device A is an algorithm 1 and a disturbance factor is n; a load sharing algorithm of the router device B is an algorithm 5 and a disturbance factor is Y; a load sharing algorithm of the router device C is an algorithm 2 and a disturbance factor is X; a load sharing algorithm of the router device E is the algorithm 2 and a disturbance factor is m; and a load sharing algorithm of the router device F is the algorithm 2 and a disturbance factor is z. It may be learned that, according to the method in this embodiment, disturbance factors of all the router devices that are in a load sharing relationship in the network are different. Therefore, when the router devices that are in a load sharing relationship perform hash route selection according to respective load sharing information, a coupling degree of load sharing results can be reduced.

S104: When the router device receives a data packet, the router device determines a forwarding path of the data packet by using the first load sharing information.

Specifically, when the router device receives the data packet, the router device performs route selection on the data packet according to the load sharing algorithm and the disturbance factor that are included in the first load sharing information, to determine that the data packet is sent by using which one of interfaces in a load sharing relationship of the router device. Specifically, the router device generally performs a hash operation on the data packet twice. In the first hash operation, the router device performs an exclusive OR operation on a source IP address and a destination IP address of the data packet, to obtain a first exclusive OR result, and then, the router device multiplies the disturbance factor by a physical outbound interface matrix of the router device. The physical outbound interface matrix of the router device includes all physical outbound interfaces in a load sharing relationship that are of the router device. Then, a rank of the matrix obtained by multiplication is obtained, and exclusive OR is performed on the first exclusive OR result and the rank of the matrix obtained by multiplication, to obtain a second exclusive OR result. An outbound interface of the data packet is determined according to a result obtained after a modulo operation is performed on the second exclusive OR result. Optionally, when performing a hash unary operation for the first time, negation may be separately performed on the source IP address and the destination IP address of the data packet, and then, an exclusive OR operation is performed on a source IP address obtained after negation and a destination IP address obtained after negation. The disturbance factor in this embodiment of the present application is a random number, and the random number is generated by the router device.

In this embodiment, each of router devices in a load sharing relationship in a network determines load sharing information of the router device by using a negotiation method, to avoid a case in which a disturbance factor of the router device is the same as a disturbance factor of another router device. Specifically, each of the router devices in a load sharing relationship obtains load sharing information of all downstream router devices that are in a load sharing relationship with the router device, and when determining load sharing information of the router device, the router device determines the load sharing information of the router device according to the load sharing information of all the downstream router devices that are in a load sharing relationship with the router device, so that a disturbance factor of the router device is different from disturbance factors of all the downstream router devices that are in a load sharing relationship with the router device. Therefore, a coupling degree of load sharing information of all the router devices in a load sharing relationship in the network is reduced, and load sharing at all levels is even.

Based on the foregoing Embodiment 1, before the router device obtains the load sharing information of all the downstream router devices that are in a load sharing relationship with the router device, the router device determines whether the router device is a leaf node. If the router device is a non-leaf node, the router device obtains the load sharing information of all the downstream router devices that are in a load sharing relationship with the router device. If the router device is a leaf node, the router device sends the second load sharing information to all upstream router devices that are in a load sharing relationship with the router device.

Figure 4:
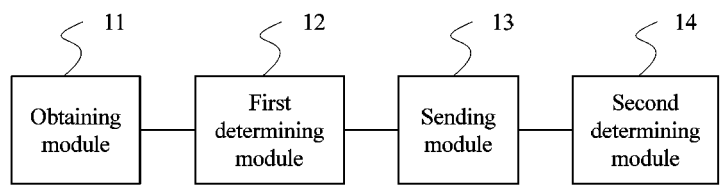
FIG. 4 is a schematic structural diagram of a router device according to Embodiment 2 of the present application.

FIG. 4 is a schematic structural diagram of a router device according to Embodiment 2 of the present application. As shown in FIG. 4, the router device in this embodiment includes: an obtaining module 11, a first determining module 12, a sending module 13, and a second determining module 14.

The obtaining module 11 is configured to obtain load sharing information of all downstream router devices that are in a load sharing relationship with the router device, where the load sharing information includes load sharing algorithms and disturbance factors of all the downstream router devices that are in a load sharing relationship with the router device.

The first determining module 12 is configured to determine first load sharing information of the router device according to the load sharing information of all the downstream router devices that are in a load sharing relationship with the router device, where the first load sharing information includes a first load sharing algorithm and a first disturbance factor that are of the router device, and the first disturbance factor is different from the disturbance factors of all the downstream router devices that are in a load sharing relationship with the router device.

The sending module 13 is configured to send the first load sharing information and the load sharing information of all the downstream router devices that are in a load sharing relationship with the router device to an upstream router device that is in a load sharing relationship with the router device.

The second determining module 14 is configured to: when the router device receives a data packet, determine a forwarding path of the data packet by using the first load sharing information.

Optionally, each piece of the load sharing information includes a lock status identifier, and the lock status identifier is used to indicate whether corresponding load sharing information is locked. The first determining module 12 is specifically configured to: determine whether lock status identifiers of the load sharing information of all the downstream router devices that are in a load sharing relationship with the router device are all a locked state; and if yes, determine the first load sharing information according to the load sharing information of all the downstream router devices that are in a load sharing relationship with the router device. Accordingly, the sending module 13 is specifically configured to: set a lock status identifier of the first load sharing information to locked, and send the first load sharing information to the upstream router device that is in a load sharing relationship with the router device.

Optionally, the obtaining module 11 is further configured to: before obtaining the load sharing information of all the downstream router devices that are in a load sharing relationship with the router device, determine whether the router device is a leaf node; and if the router device is a non-leaf node, obtain the load sharing information of all the downstream router devices that are in a load sharing relationship with the router device. If the router device is a leaf node, the sending module 13 is further configured to send second load sharing information to the upstream router device that is in a load sharing relationship with the router device, where the second load sharing information includes a second load sharing algorithm and a second disturbance factor that are of the router device.

In this embodiment, the obtaining module 11 is specifically configured to: send a load sharing request message to an adjacent downstream router device, and receive a load sharing response returned by the adjacent downstream router device, where the load sharing response includes the load sharing information of all the downstream router devices that are in a load sharing relationship with the router device.

The router device in this embodiment may be configured to implement the technical solution in Embodiment 1, and specific implementation manners and technical effects thereof are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A load sharing method, comprising:
obtaining, by a router device, load sharing information of all downstream router devices that are in a load sharing relationship with the router device, wherein the load sharing information comprises load sharing algorithms and disturbance factors of all the downstream router devices;
determining, by the router device, first load sharing information of the router device according to the load sharing information of all the downstream router devices, wherein the first load sharing information comprises a first load sharing algorithm of the router device and a first disturbance factor of the router device, and wherein the first disturbance factor is different from the disturbance factors of all the downstream router devices;
sending, by the router device, the first load sharing information and the load sharing information of all the downstream router devices to an upstream router device that is in a load sharing relationship with the router device;
receiving, by the router device, a data packet;
performing, by the router device, a hash route selection based on the first load sharing algorithm and the first disturbance factor; and
determining, by the router device, a forwarding path of the data packet based on the hash route selection.

2. The method according to claim 1, wherein each piece of the load sharing information comprises a lock status identifier, and the lock status identifier is used to indicate whether corresponding load sharing information is locked;
the determining, by the router device, first load sharing information of the router device according to the load sharing information of all the downstream router devices comprises:
determining, by the router device, whether lock status identifiers of the load sharing information of all the downstream router devices are all in a locked state; and
if the lock status identifiers of the load sharing information of all the downstream router devices are all in the locked state, determining, by the router device, the first load sharing information according to the load sharing information of all the downstream router devices; and
the sending, by the router device, the first load sharing information to an upstream router device comprises:
setting, by the router device, a lock status identifier of the first load sharing information to the locked state, and sending the first load sharing information to the upstream router device.

3. The method according to claim 1, wherein before the obtaining, by a router device, load sharing information of all downstream router devices that are in a load sharing relationship with the router device, the method further comprises:
determining, by the router device, whether the router device is a leaf node; and
if the router device is a non-leaf node, obtaining, by the router device, the load sharing information of all the downstream router devices that are in a load sharing relationship with the router device.

4. The method according to claim 3, wherein if the router device is a leaf node, the router device sends second load sharing information to the upstream router device, wherein the second load sharing information comprises a second load sharing algorithm of the router device and a second disturbance factor of the router device.

5. The method according to claim 1, wherein the obtaining, by a router device, load sharing information of all downstream router devices that are in a load sharing relationship with the router device comprises:
sending, by the router device, a load sharing request message to an adjacent downstream router device; and
receiving, by the router device, a load sharing response returned by the adjacent downstream router device, wherein the load sharing response comprises the load sharing information of all the downstream router devices.

6. A router device, comprising:
a non-transitory memory comprising instructions;
a processor coupled to the memory, wherein the processor is configured to execute the instructions to:
obtain load sharing information of all downstream router devices that are in a load sharing relationship with the router device, wherein the load sharing information comprises load sharing algorithms and disturbance factors of all the downstream router devices;
determine first load sharing information of the router device according to the load sharing information of all the downstream router devices, wherein the first load sharing information comprises a first load sharing algorithm of the router device and a first disturbance factor of the router device, and wherein the first disturbance factor is different from the disturbance factors of all the downstream router devices;
send the first load sharing information and the load sharing information of all the downstream router devices to an upstream router device that is in a load sharing relationship with the router device; and
when the router device receive a data packet;
perform a hash route selection based on the first load sharing algorithm and the first disturbance factor;

determine a forwarding path of the data packet based on the hash route selection.

7. The router device according to claim 6, wherein each piece of the load sharing information comprises a lock status identifier, and the lock status identifier is used to indicate whether corresponding load sharing information is locked;

the processor is further configured to execute the instructions to:

determine whether lock status identifiers of the load sharing information of all the downstream router devices are all in a locked state; and if the lock status identifiers of the load sharing information of all the downstream router devices are all in the locked state, determine the first load sharing information; and set a lock status identifier of the first load sharing information to locked, and send the first load sharing information to the upstream router device.

8. The router device according to claim 6, wherein the processor is further configured to execute the instructions to:

before obtaining the load sharing information of all the downstream router devices that are in a load sharing relationship with the router device, determine whether the router device is a leaf node; and if the router device is a non-leaf node, obtain the load sharing information of all the downstream router devices.

9. The router device according to claim 8, wherein if the router device is a leaf node, the processor is further configured to execute the instructions to:

send second load sharing information to the upstream router device, wherein the second load sharing information comprises a second load sharing algorithm of the router device and a second disturbance factor of the router device.

10. The router device according to claim 6, wherein the processor is further configured to execute the instructions to:

send a load sharing request message to an adjacent downstream router device; and receive a load sharing response returned by the adjacent downstream router device, wherein the load sharing response comprises the load sharing information of all the downstream router devices.

* * * * *